March 7, 1967  L. CLARK  3,307,789
ELECTROSTATIC SPRAYING OF TWO COMPONENTS
Filed Jan. 8, 1964
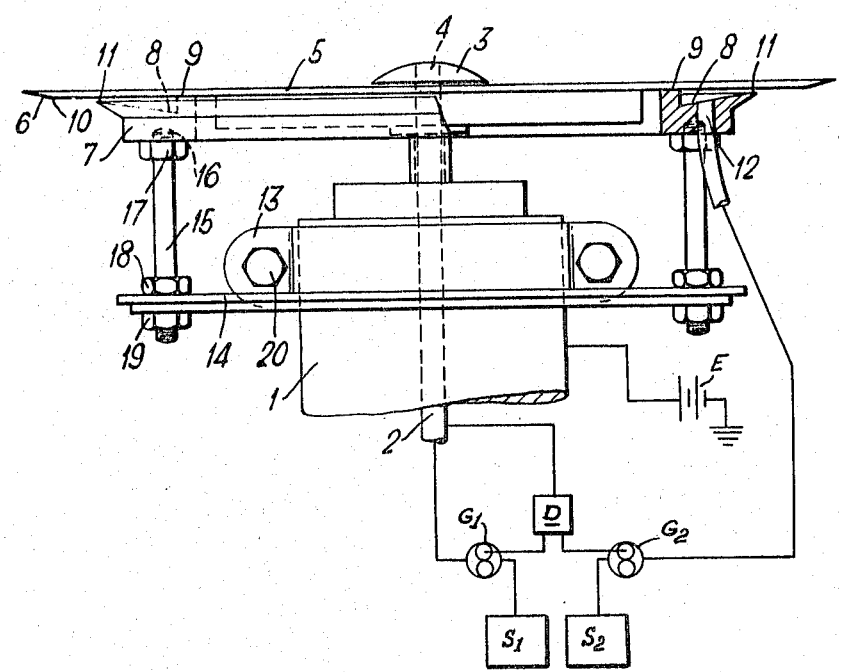
Leonard Clark,
Inventor
By Wenderoth,
Lind and Ponack
Attorneys United States Patent Office 3,307,789
Patented Mar. 7, 1967

3,307,789
ELECTROSTATIC SPRAYING OF TWO COMPONENTS
Leonard Clark, Woodford Green, Essex, England, assignor to Berger, Jenson & Nicholson Limited, London, England, a British company
Filed Jan. 8, 1964, Ser. No. 336,405
Claims priority, application Great Britain, Jan. 10, 1963, 1,233/63
4 Claims. (Cl. 239—214.25)

This invention is for improvements in or relating to electrostatic spraying.

It is by now well known to achieve a more complete utilisation of a paint than can be attained by normal spray-gun procedure, by discharging fine droplets of a paint composition which carry an electrostatic charge and are therefore attracted to the article to be painted by reason of that article being either oppositely charged or earthed.

Electrostatic spray apparatus comprises a rotating disc to the surface of which the surface-coating composition is applied, the disc rotating at such a speed as to fling the paint off from the edge or periphery in the form of very fine droplets and these droplets are electrostatically charged and are directed in a stream towards the article to be coated by the application of a directive electrostatic field.

In recent years, there have been developments in the art of surface-coatings which have led to the production of two-component compositions, one component ordinarily being a catalyst composition, or some other substance which brings about the rapid setting of the other component of the coating composition. The catalyst composition ordinarily constitutes a very minor proportion of the total surface-coating mixture and, because of its property of bringing about a rapid setting of the main constituents of the composition, the two compositions cannot be mixed together for more than a very short period of time prior to application to the surface to be treated.

The present invention has for an object to provide a method and an apparatus which will make possible the application by an electrostatic spray method of two-component coating compositions.

According to the present invention, therefore, there is provided a method for electrostatically applying a two-component surface-coating composition which comprises feeding one component of the composition to one side of the rotating disc and feeding the other component to the other side of the disc at a rate such as to provide the desired ratio between the two components. Preferably, both components are fed to the disc by means of gear pumps, which pumps are coupled to a common driving member in such a way as to ensure that the two components of the final coating composition are intimately admixed in the exact proportions required.

One type of two-component system comprises one or more polymerisable compounds as one component, the other component being a polymerisation catalyst. Another type of two-component system comprises two components which are spontaneously reactive towards one another.

The type of two-component system which has been used with advantage in the method and apparatus of the present invention is an accelerator-containing unsaturated polyester/styrene mixture as the major ingredient and a peroxide catalyst solution as the minor ingredient. These have been used satisfactorily at a ratio of 10 to 1 by volume respectively. Other two-component systems which could be successfully used include an epoxy resin-amine catalyst system, and a polyurethane-polyester system.

The invention also includes electrostatic spray apparatus for use with surface-coating compositions comprising a rotating disc, which is horizontally disposed or which is inclined at an angle to the horizontal plane, mounted upon a hollow shaft, said shaft being provided with a delivery orifice so arranged as to deliver a stream of one component of a surface-coating composition, fed through the hollow shaft, to the upper surface of said disc and a circular trough mounted co-axially with said disc so that the inner edge of said trough is in rubbing engagement with the under-side of said disc, the outer edge thereof being spaced away from the under-side of said disc by an amount sufficient to allow a second component of a surface-coating composition to flow in a thin stream from said circular trough onto the under-side of said disc; it will be appreciated that with the construction of the present invention, the two components are fed to the upper side and under-side of the rotating disc and become intimately admixed at the periphery of the disc at the moment when the two components are discharged from the periphery of the disc in small droplets.

To ensure that the correct ratio between the two components is maintained, the feed means for the two components, e.g. gear pumps, are driven by a common driving member.

The following is a description, with reference to the accompanying drawing, of one embodiment of electrostatic spray apparatus in accordance with the present invention which shows that portion of the conventional electrostatic spray apparatus which is modified by the provision of the feed means for the second component which constitutes the essence of the present invention.

The drawing is a side elevation in part section of the upper portion of an electrostatic spray unit.

As will be seen from the drawing, the apparatus comprises a supporting column carrying a rotatable hollow driving shaft 1 within which there is disposed a concentric tube 2, the shaft being connected to the disc 6 so that rotation of the shaft causes the disc to be rotated. The tube 2, which constitutes a feed passage, terminates with an orifice 4 in the boss 3 so that the first component of the two-component composition being fed by a gear pump G, from a supply S, through the feed passage 2, escapes via the orifice 4 onto the upper surface 5 of the rotatable disc 6.

The apparatus so far described is conventional in character for use with compositions involving only a single component and with this apparatus there will be associated the usual means E (shown diagrammatically) for producing an electrostatic charge on the particles of the composition which, during rotation of the disc 6, are flung from the periphery of the disc by centrifugal force.

The modification of the conventional apparatus as so far described which constitutes the present invention, consists in providing an auxiliary feed for the second component. The auxiliary feed is constituted by an annular member 7 which is formed in its upper surface with a trough, as shown at 8, the trough being formed by cutting a downwardly inclined surface into the upper surfaces of the annular member 7, the inclined surface extending from the outer edge of the annular member to a point short of its inner surface.

As so constituted, the annular member 7 has an upstanding surface 9 which, in use, is so positioned as to be in rubbing engagement with the under-surface 10 of the disc 6. The peripheral edge 11 of the annular member 7 is cut-away so as to be slightly lower than the level of the surface 9 so that when the annular member 7 is positioned with the surface 9 in rubbing engagement with the surface 10 of the disc, there is a small gap conveniently about a 2000th of an inch between the peripheral edge 11 and the under-surface 10 of the disc. In order to supply the second component to the trough 8, there is provided a feed orifice 12 which will be connected by a conduit to a source of supply S2 of the second component, the conduit being shown schematically.

In order to mount the annular member 7 in its proper relationship to the disc 6, there is provided a clamp 13 which has a number of lugs 14 extending therefrom, the said lugs being adapted to receive studs 15 which are screw-threaded at each end so that one end is in engagement with a complementary screw-thread 16 in the annular member 7, a lock-nut 17 being provided to hold the stud 15 firmly in place. Towards the lower end of the stud 15 a nut 18 is disposed which acts as a spacing member and the stud is firmly fastened in position by means of the nut 19 which firmly clamps the lug 14 between the nuts 18 and 19.

In the operation of the apparatus according to the present invention, the main paint or varnish component is fed through the feed passage 2 in the normal way, the second component being fed into the trough 8 by way of the feed orifice 12. With the annular member 7 being adjusted as above described, a thin film of the second component is applied to the under-side 10 of the rotating disc 6 and, as the disc is rotated, the two components, fed respectively via the orifice 4 to the top surface 5 of the disc and via the trough 8 to the under-side 10 of the disc, are flung by centrifugal force to the periphery of the disc from whence they are discharged. In conventional manner, the small droplets discharged from the edge of the disc are electrostatically charged and are therefore attracted to the object upon which the two-component surface-coating composition is to be deposited by virtue of that article being either oppositely charged or earthed.

In order to control the ratio in which the two components are fed to the apparatus of the present invention, separate feed means are provided which are coupled together so as to be driven by a common driving member D. The precise feed mechanism is shown schematically as most conveniently constituted by two gear pumps G1 and G2 which are coupled to the common driving member.

It will be appreciated that, by providing adjustable gear ratios connecting the two gear pumps to the common driving member, the apparatus can be made adjustable so as to be capable of use with different two-component coating compositions in which the ratio between the two components needs to be varied from case to case.

Although reference has been made to the use of gear pumps, it will be appreciated that any other convenient means of feeding the two components of the coating composition to the disc can be adopted.

I claim:

1. An apparatus for forming a spray of two reactive components of a surface coating composition and which is adapted to be used in an electrostatic spray apparatus, said apparatus comprising a disc, a hollow rotating shaft on which said disc is mounted, means coupled to said shaft for driving said shaft, said shaft having a delivery orifice adjacent the upper surface of said disc for delivering a stream of one component of the surface coating composition being fed through the hollow shaft to the upper surface of said disc, a circular trough mounted coaxially with said disc and having an inner edge in rubbing engagement with the under side of said disc and having an outer edge spaced from the under side of said disc a distance sufficient to allow the second component of the surface coating composition to flow in a thin layer from said circular trough onto the under side of said disc, a conduit opening into said trough for feeding the second component to said trough, and feed means coupled to said conduit and said hollow shaft for feeding one of the two components to said hollow shaft and separately feeding the other component to said conduit and said circular trough.

2. An apparatus according to claim 1 wherein the circular trough has a downwardly inclined surface cut into the upper surface of an annular member from the periphery thereof to a point short of the inner surface of said annular member and said inlet conduit extends upwardly into said trough through its bottom surface.

3. An apparatus according to claim 1 wherein the feed means for the two components are driven feed means, and a common driving member coupled to said feed means for driving said feed means.

4. An apparatus according to claim 3 wherein the feed means comprise two gear pumps coupled to a common driving member.

References Cited by the Examiner

UNITED STATES PATENTS

| 2,456,853 | 12/1948 | Arbion | 117—93.42 X |
|---|---|---|---|
| 2,643,243 | 6/1953 | Dannenberg | 117—105.3 X |
| 2,677,626 | 5/1954 | Bodle et al. | 117—93.4 |
| 2,813,751 | 11/1957 | Barrett. | |
| 2,823,143 | 1/1958 | Upperman | 117—105.5 |
| 3,011,472 | 12/1961 | Kent et al. | 117—93.4 X |
| 3,017,114 | 1/1962 | Marvin | 239—3 |
| 3,066,874 | 12/1962 | Becker. | |
| 3,096,001 | 7/1963 | Boe et al. | |
| 3,129,112 | 4/1964 | Marvin | 117—105.5 X |
| 3,147,137 | 9/1964 | Glass et al. | 117—105.5 X |
| 3,179,341 | 4/1965 | Plos et al. | 117—105.5 X |

ALFRED L. LEAVITT, *Primary Examiner.*

A. GOLIAN, *Assistant Examiner.*